US008011496B2

(12) United States Patent
Seger et al.

(10) Patent No.: US 8,011,496 B2
(45) Date of Patent: Sep. 6, 2011

(54) CONVEYOR MEANS FOR ARTICLES

(75) Inventors: Martin Seger, Neumarkt i. d. Opf (DE); Wolfgang Hausladen, Moetzing (DE)

(73) Assignee: Krones AG, Neutraubling (DE)

( * ) Notice: Subject to any disclaimer, the term of this patent is extended or adjusted under 35 U.S.C. 154(b) by 92 days.

(21) Appl. No.: 12/536,850

(22) Filed: Aug. 6, 2009

(65) Prior Publication Data

US 2010/0038212 A1 Feb. 18, 2010

(30) Foreign Application Priority Data

Aug. 14, 2008 (DE) .......................... 10 2008 044 430

(51) Int. Cl.
*B65G 21/18* (2006.01)

(52) U.S. Cl. .......................... 198/778; 198/831; 198/850

(58) Field of Classification Search .................. 198/778, 198/831, 850, 851, 852, 853
See application file for complete search history.

(56) References Cited

U.S. PATENT DOCUMENTS

| 2,256,005 | A | | 9/1941 | Wood | |
|---|---|---|---|---|---|
| 3,094,206 | A | | 6/1963 | Stewart et al. | |
| 3,854,575 | A | * | 12/1974 | Fraioli, Sr. ................ | 198/831 |
| 4,227,610 | A | * | 10/1980 | Gerdes et al. ............. | 198/831 |
| 5,332,082 | A | * | 7/1994 | Sommerfield ............ | 198/831 |
| 5,911,306 | A | | 6/1999 | Ferrari | |
| 6,336,551 | B1 | * | 1/2002 | Balk ......................... | 198/852 |
| 6,386,355 | B1 | | 5/2002 | Willems | |
| 6,564,930 | B1 | * | 5/2003 | Colding-Kristensen et al. ......................... | 198/778 |
| 2003/0170421 | A1 | | 9/2003 | Damkjaer | |
| 2008/0164124 | A1 | | 7/2008 | Reist et al. | |

FOREIGN PATENT DOCUMENTS

| DE | 69623434 | 8/2003 |
|---|---|---|
| DE | 69909754 | 6/2004 |
| EP | 0068666 | 1/1983 |
| EP | 0545398 | 6/1993 |
| EP | 0704388 | 8/2001 |
| EP | 1009692 | 11/2003 |
| EP | 1135313 | 1/2006 |
| EP | 2050696 | 4/2009 |
| FR | 2775674 | 9/1999 |
| WO | 9935063 | 7/1999 |
| WO | 2006/120354 | 11/2006 |
| WO | 2009036580 | 3/2009 |

* cited by examiner

*Primary Examiner* — James R Bidwell
(74) *Attorney, Agent, or Firm* — Simpson & Simpson, PLLC

(57) ABSTRACT

A conveyor means (1) for transporting articles (3) by an endless conveyor belt (5) is disclosed. The endless conveyor belt (5) has lengthwise two sides (6) and is lead on a support (11) and composed of a plurality of chain links (9). The endless conveyor belt (5) has a curved path (8) in at least one section and the curved path (8) having a radius of curvature (44) with reference to a central point (42) of a circle (40). The support (11) has at least one inner guiding (17) for the endless conveyor belt (5), and the inner guiding (17) running along an inner side section (7) of a side (6) of the endless conveyor belt (5) being directly opposite of the central point (42) at the curved path (8). A plurality of rolls (21) is arranged along the inner guiding (17), wherein the rolls (21) operating with each face (23) of the chain links (9).

13 Claims, 6 Drawing Sheets

CONVEYOR MEANS FOR ARTICLES

CROSS REFERENCE TO RELATED APPLICATION

This patent application claims the benefit of German Patent Application No. 10 2008 044 430.8, filed on Aug. 14, 2008, which application is hereby incorporated by reference in its entirety.

FIELD OF THE INVENTION

The present invention relates to a conveyor means for transporting articles.

BACKGROUND OF THE INVENTION

European Patent EP 1 009 692 B1 discloses a conveyor means for transporting articles in an upright direction on a helical path on an endless conveyor belt of chain links which are positioned on slats in an axis of the slats. The slats form the endless conveyor belt. At least a number of slats is provided with at least a guide roll in order to ensure smooth and constant movement of the conveyor means. Since the rolls are positioned in between the slats and the support at the moving endless conveyor belt, defective rolls cannot be detected easily nor can single rolls be removed easily and quickly and attached and/or replaced respectively.

European Patent EP 1 135 313 B1 discloses a conveyor belt of bearing link coupling joints and chain links respectively. Each chain link comprises two link joints on a side and a nozzle on the opposite side. The nozzle interacts with the link opening of the adjacent chain link in a positive locking way. A roll is provided at least on one side of each chain link wherein the roll touches a leading and roll rail respectively along the conveyor means in order to reduce friction, if a regulation for an inner curvature position is carried out in a belt track.

As described in detail in the prior art beforehand, problems regarding conveyor means with chain link belts with curved path sections arise in such a way that polygon effects, and radial forces and friction forces impact on the chain links, jeopardizing a smooth, constant, and little force using movement of the chain links.

SUMMARY OF THE INVENTION

Therefore, the object of the invention is to provide a conveyor means for transporting articles with an endless conveyor belt having a curved path in at least one section so that smooth and constant movement of the conveyor means is ensured. Furthermore, the conveyor means should be maintained easily as well as be produced easily and economically.

The above object is achieved by a conveyor means for transporting articles comprising: an endless conveyor belt, wherein the endless conveyor belt having lengthwise two sides; a support leads the endless conveyor belt and is composed of a plurality of chain links; a curved path defined by the endless conveyor belt in at least one section, wherein the curved path having a radius of curvature with reference to a central point of a circle; at least an inner guiding for the endless conveyor belt is provided for the support, and the inner guiding running along an inner side section of a side of the endless conveyor belt which is directly opposite to the central point at the curved path; and a plurality of rolls arranged along the inner guiding running alongside of the inner side section which interact with a face of each chain link.

The above object is additionally achieved by a conveyor means for transporting articles comprising: an endless conveyor belt, wherein the endless conveyor belt is in the form of a spiral conveyor and having lengthwise two sides; a support leads the endless conveyor belt and is composed of a plurality of chain links; a curved path defined by the spiral conveyor, wherein the curved path having a radius of curvature with reference to a central point of an axis of the spiral conveyor; at least an inner guiding for the endless conveyor belt of the spiral conveyor is provided for the support, and the inner guiding running along an inner side section of a side of the endless conveyor belt which is directly opposite to the axis if the spiral conveyor; and a plurality of rolls arranged along the inner guiding running alongside of the inner side section which interact with a face of each chain link and the faces of the chain links have a curvature corresponding to the curvature of the inner guiding of the spiral conveyor.

The above object is further achieved by a conveyor means for transporting articles comprising: an endless conveyor belt, wherein the endless conveyor belt is in the form of a spiral conveyor and having lengthwise two sides; a support leads the endless conveyor belt and is composed of a plurality of chain links; a curved path defined by the spiral conveyor, wherein the curved path having a radius of curvature with reference to a central point of an axis of the spiral conveyor; at least an inner guiding for the endless conveyor belt of the spiral conveyor is provided for the support, and the inner guiding running along an inner side section of a side of the endless conveyor belt which is directly opposite to the axis of the spiral conveyor; a plurality of rolls arranged along the inner guiding running alongside of the inner side section which interact with a face of each chain link and the faces of the chain links have a curvature corresponding to the curvature of the inner guiding of the spiral conveyor; and dogs and/or hubs for the articles to be transported are provided on the endless conveyor belt.

In the following, the conveyor means for transporting articles by an endless conveyor belt according to the invention is described. Thereby, the articles can be transported selectively on the endless conveyor belt in an upright position. Other combinations, however, are also possible according to which the articles can be transported by means of an endless conveyor belt without having to be positioned upright thereon. The endless conveyor belt is lead on a support and composed of a plurality of chain links. At least one section of the endless conveyor belt is defined by a curved path and the curved path defines a radius of curvature with reference to a central point of a circle.

In order to avoid and reduce the above-mentioned polygon effects, radial forces and friction forces, tilt, in an up and down movement of the chain links along the curved path, the support for the endless conveyor belt is provided with at least one inner guiding. The inner guiding of the support interacts with an inner side section of a side of the endless conveyor belt which lies directly opposite of the central point at the curved path. Thus, this side of the endless conveyor belt is positioned at the curved path closer to the central point of the circle described above than the other side lying opposite of the endless conveyor belt. The two sides run along the length of the endless conveyor belt and trace out the endless conveyor belt.

A plurality of rolls along the inner guiding on the support is provided according to the invention for an even better guidance of the chain links. These rolls interact with each face of the chain links wherein the faces run along the inner side section at the curved path described above.

An advantage of the invention is that defective rolls can be detected and exchanged easily since the rolls are attached stationary at the inner guiding of the support. The rolls are in particular easily and quickly exchangeable if in each case a freely accessible roll mounting is provided at the support. Rolls according to the prior art are generally positioned on the chain links and/or in other parts of the endless conveyor belt and thereby move with the endless conveyor belt during transport.

In an embodiment of the invention, the endless conveyor belt of the conveyor means transcends at least one vertical height. This applies in particular to spiral conveyors (see FIG. 1) where the curved path is a continuously spiral curvature running from the bottom to the top and the chain links form a tackle on the spiral curvature.

As it is generally known, polygon effects can be further avoided if the faces of the chain links interacting with the rolls are provided with a curvature, wherein the curvature corresponds with the curvature of the inner guiding along the curved path.

In an embodiment of the invention, per chain link, at least two rolls of the inner guiding are in roll contact with the respective chain link during transport. This also reduces tilting movements of the chain links, particularly if the chain links are lead both along a curved path and have to transcend a vertical height as in the case with a spiral conveyor. The distances between each two adjacent rolls must be adjusted accordingly and appropriately to the length of the single chain links. In addition, means for manual or automatic adjustment of the distances between the rolls can be provided.

The described rolls reduce unwanted polygon effects, and radial forces and friction forces interacting on the faces of the chain links. As it is generally known, interacting friction forces in between the undersurface of the chain links and the top surface of the support can be reduced if at least one carrying roll is positioned underneath at least several chain links. The carrying rolls on the undersurfaces of the chain links roll on the top surface of the support for the endless conveyor belt.

The chain links of the endless conveyor belt are easily and economically producible if they are of injection molded parts, and in particular if each chain link is one sole injection molded part, made of polymer, for example.

In addition, known anti-friction agents such as oils or fats provide a good (TAB) leading of the chain links.

In addition to the described embodiments, in a further embodiment of the conveyor means the endless conveyor belt can be provided with additional supports for the articles to be transported. Generally, the articles can be the most varied items, such as liquid containers or bottles, or packs with liquid containers and bottles respectively or the like. The mentioned supports can be provided, for instance, by bearing plates which can be optimally adjusted to the shape and size of the articles to be transported so that a reliable and failure-free transport of all desired items is ensured.

A further embodiment of the conveyor means according to the invention is characterized in that the endless conveyor belt is provided with additional dogs functioning as a support and/or hub for the articles to be transported. These dogs can be formed, for example, by lamellar shaped disks or carrier stud links which are mounted in the desired distance consecutively on the chain, so that an exact adjustment to the size and the dimensions of the articles to be transported is enabled. Such an embodiment is particularly suitable for the transport of packs or for the transport of other piece goods. The dogs can also be formed to nearly any form and shape by means of cramps so that it is possible to transport items of nearly any form. An advantageous embodiment can also provide the combination of a conveyor chain with a further carrier chain or another traction mechanism mounted thereon, if applicable. Thereby, the lower chain serves as a traction mechanism while the upper chain can serve for placing bottles or other articles thereon.

BRIEF DESCRIPTION OF THE DRAWINGS

Embodiments of the present invention will now be explained in greater detail on the basis of the accompanying figures. The proportions of the individual elements to each other in the figures do not always correspond with the real proportions since some forms are shown simplified whereas other forms are shown for the sake of a better demonstration enlarged in relation to other elements.

DETAILED DESCRIPTION OF THE INVENTION

Identical reference numbers refer to the same elements throughout the various figures. Furthermore, only reference numbers necessary for the description of the respective figure are shown in the individual figures. The shown embodiments are only examples of how the apparatus according to the invention should be designed and should not be regarded as a limitation of the invention.

Figure 1:
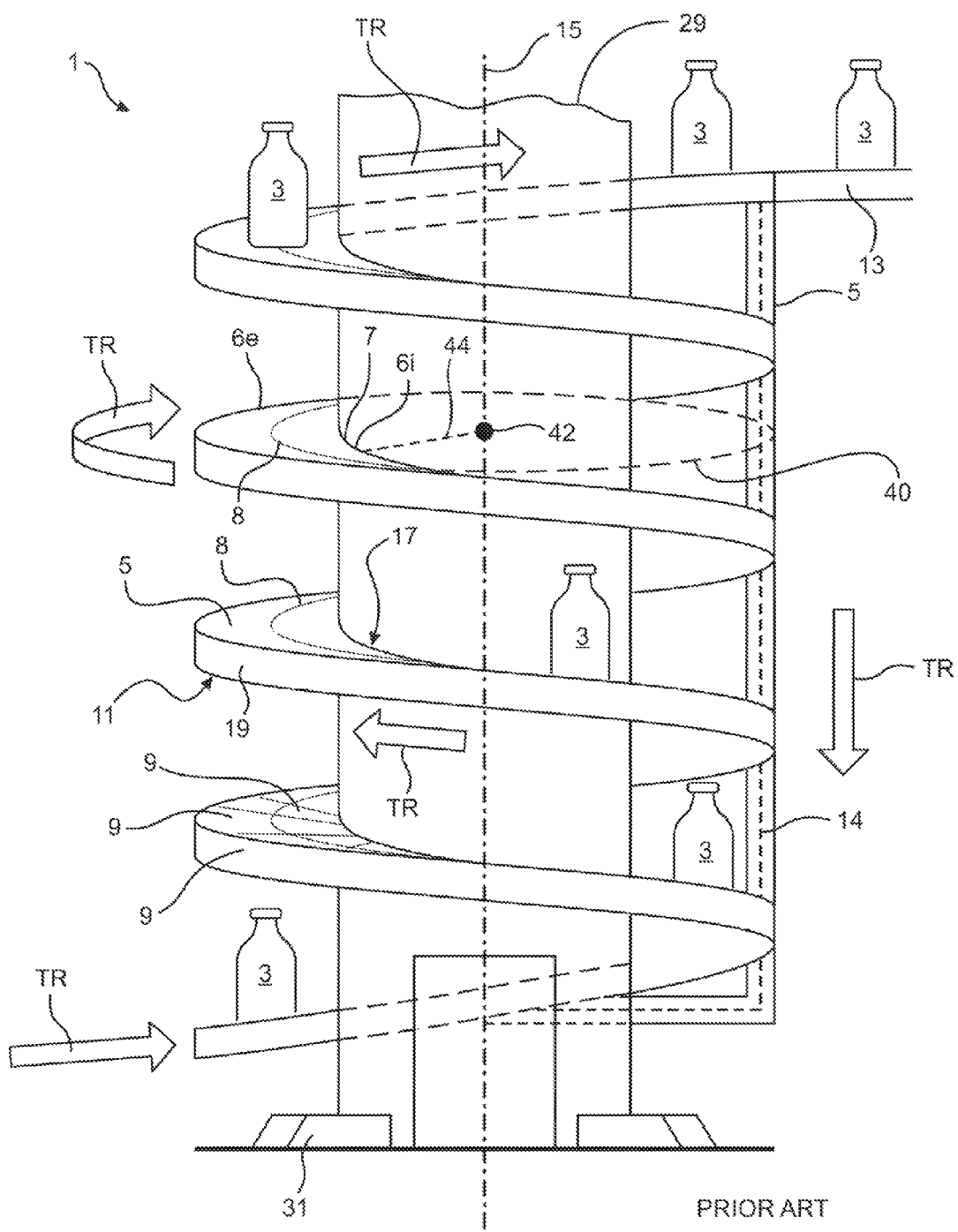
FIG. 1 shows a lateral view of a conveyor means which is designed as a spiral conveyor according to the prior art.

FIG. 1 shows a schematic lateral view of a conveyor means 1 being designed as a spiral conveyor according to the prior art. Articles 3, in this context beverage bottles, are transported consecutively on an endless conveyor belt 5 in a transport direction TR. The endless conveyor belt 5 is positioned on a support 11. The articles 3 are firstly transported to the spiral conveyor at the lower end of the spiral conveyor; then transported upwards on a curved, in this context on a continuous spiral path 8 about a frame 29 of the spiral conveyor. At the upper end of the spiral conveyor, the articles 3 are then usually transported on the achieved height onto a continuative upper path section 13. The endless conveyor belt 5 is lead at the upper end of the spiral conveyor before the upper path section 13 downwards into a release travel 14 and back to the beginning at the lower end of the spiral conveyor.

The frame 29 of the conveyor means 1 stands on feet 31 in the embodiment shown in FIG. 1. The medium center line of the frame 29 is an inner longitudinal axis 15, along which central points 42 of circles 40 are positioned. Thereby, the spiral curved path 8 defines radiuses of curvature 44 referring to the respective center points 42 of the respective circles 40, wherein the center points 42 are positioned on the longitudinal axis 15. As it is known, in a spiral path 8 running from the bottom to the top there are endlessly lots of such circles 40 lying on top of each other. Only one circle 40 of such a kind is exemplarily shown in FIG. 1.

The rolls 21 (not shown in FIG. 1, see FIG. 2) of the conveyor means 1 according to the invention are therefore particularly suitable for being positioned at the outer wall of the frame 29 and to interact with the inner faces of the chain links 9 facing the frame 29. For the sake of clarity, only three chain links 9 are schematically shown in FIG. 1. The inner side section 7 of the endless conveyor belt 5 and the inner guiding 17 of the frame 29 run along the inner side 6 facing the frame 29 and running spirally upwards along the frame 29.

Rolls are neither necessary on the sides of the chain links 9 nor on other sides of the chain links 9 along the linear release travel 14, since no radial forces or friction forces interact onto the chain links 9 and also no polygon effects emerge here. Rolls are only recommendable on the spiral curved path 8.

An outer guiding 19 for the chain links 9 is schematically shown directly opposite of the outer side $6_e$ of the endless conveyor belt 5.

Figure 2:
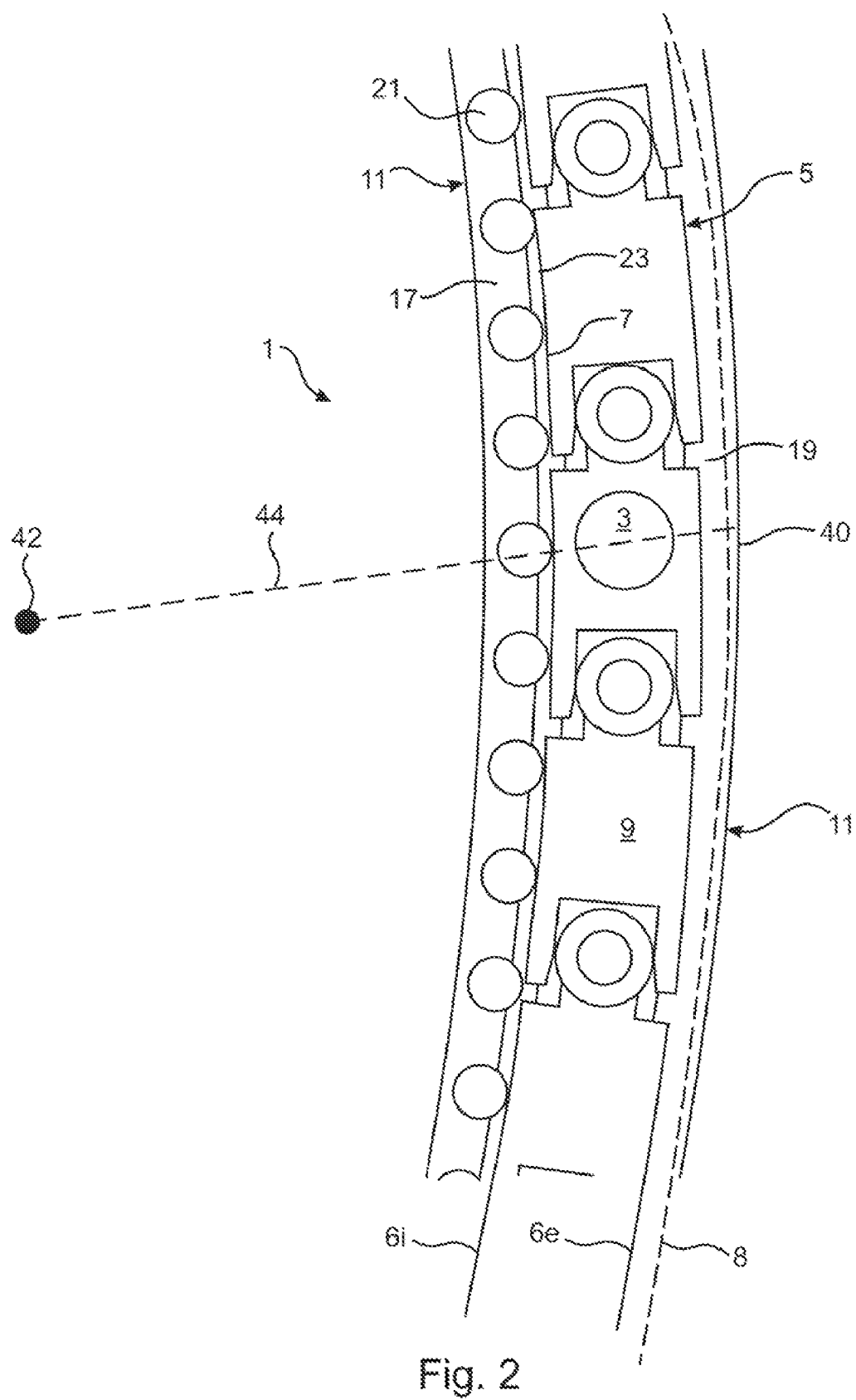
FIG. 2 shows a schematic top view onto a section of an endless conveyor belt subject to an embodiment of the conveyor means according to the invention.

FIG. 2 shows a top view onto a section of an endless conveyor belt 5 subject to an embodiment of the conveyor means 1 according to the invention. The shown section could be, for instance, a section of a spiral curved path 8 if the conveyor means 1 was a spiral conveyor.

The endless conveyor belt 5 is formed by two sides $6_i$ and $6_e$ running along its length, in between chain links 9 of the endless conveyor belt 5 are arranged. The chain links 9 are being led via a support 11.

The shown section of the endless conveyor belt 5 defines a curved path 8, wherein said curved path 8 defines a radius of curvature 44 regarding a center point 42 of a circle 40. For the sake of a clear view, the length of the radius of curvature 44 is shown too short in comparison with the shown curvature of the path 8. The inner side $6_i$ of the endless conveyor belt 5 faces directly the center point 42 and the outer side 6e is averted from the center point 42. An article 3 in top view is shown on the chain link 9, through which the shown radius of curvature 44 runs.

An inner guiding 17 for the endless conveyor belt 5 is provided at the support 11. Thereby, the inner guiding 17 runs directly opposite of an inner side section 7 of the inner side $6_i$ of the endless conveyor belt 5. A plurality of rolls 21 is arranged along the inner guiding 17, wherein said rolls 21 interact with a side face 23 of the chain links 9.

An outer guiding 19 for the endless conveyor belt 5 is likewise provided at the support 11. Thereby, the outer guiding 19 runs directly opposite of the outer side $6_e$ of the endless conveyor belt 5 and comprises no rolls.

Figure 3:
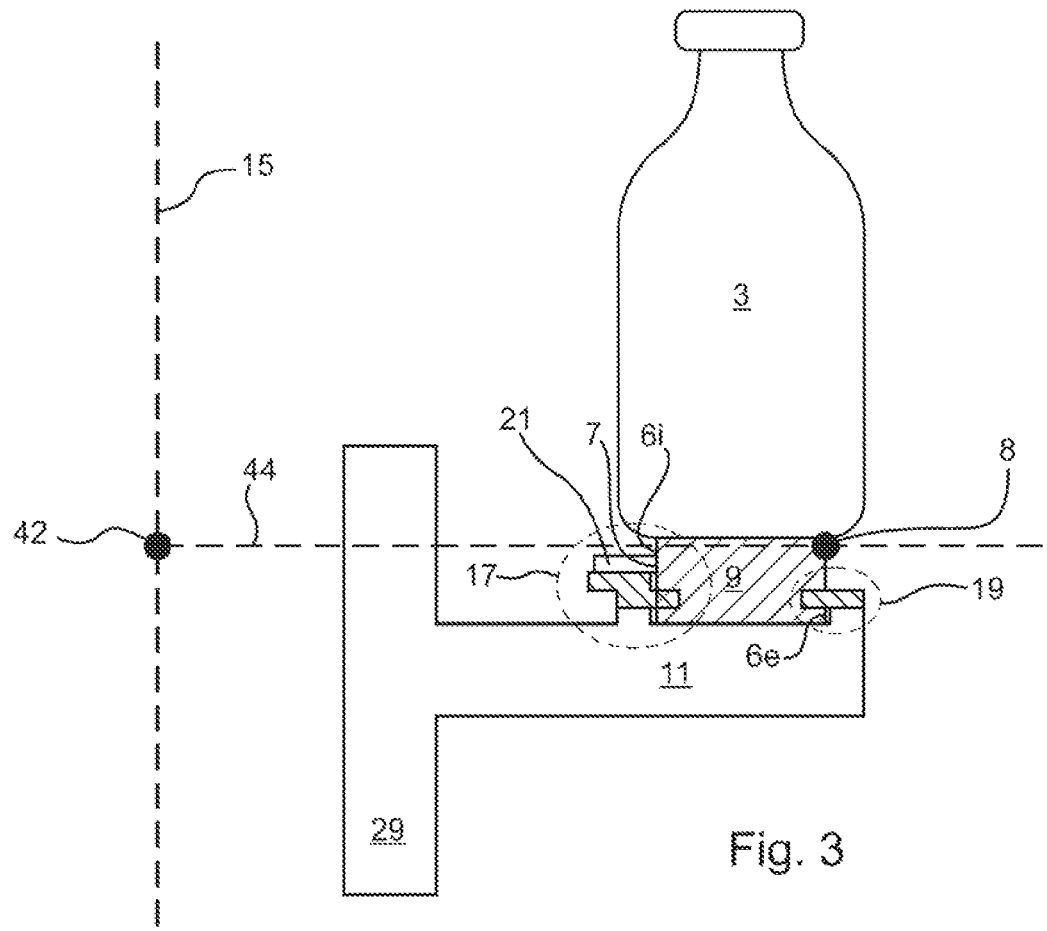
FIG. 3 shows schematically a cross-section along the radius of curvature of the section of the endless conveyor belt subject to the embodiment of the conveyor means according to the invention of FIG. 2.

FIG. 3 shows schematically a cross-section along the radius of curvature 44 of the section of the endless conveyor belt 5 subject to the embodiment of the conveyor means 1 according to the invention subject to FIG. 2. An inner longitudinal axis 15 defines the inside of the conveyor means 1, of a spiral conveyor, for example. As described in the FIGS. 1 and 2, the center point 42 of the circle 40 is positioned on the inner longitudinal axis 15. A portion of the frame 29 is shown, about which the curved path 8 of the endless conveyor belt 5 coils up. The path 8 is visible only as a point in the cross-section. A support 11 is provided around the frame 29 and going laterally off said frame 29.

The inner guiding 17 is positioned directly opposite of the inner side $6_i$ of the chain link 9 and the outer guiding 19 is positioned directly opposite of the outer side $6_e$ of the chain link 9. The inner guiding 17 and the outer guiding 19 comprise each a guide slide support (see FIGS. 4 and 5). In addition, the inner guiding 17 opposite of the inner side section 7 of the endless conveyor belt 5 comprises a roll 21.

Figures 4, 5:
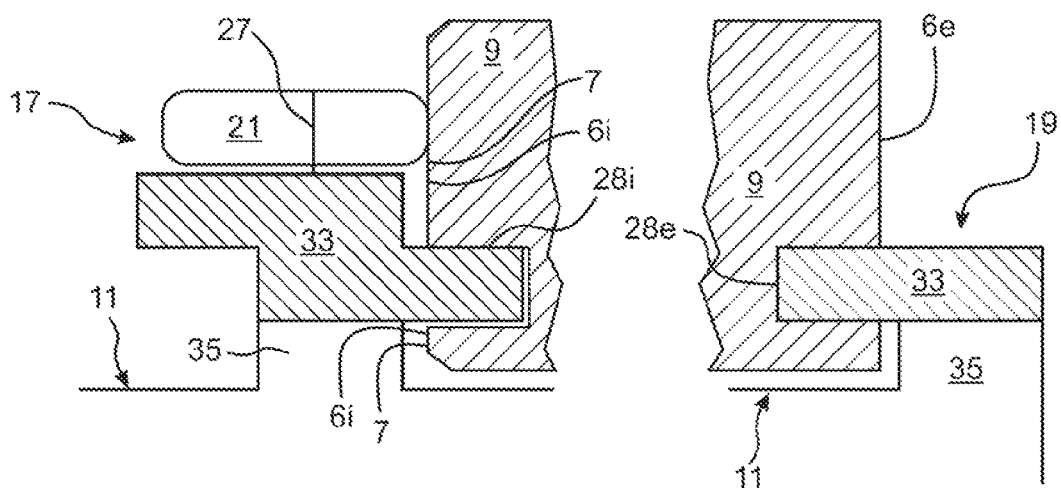
FIG. 4 shows a schematic detailed view of the inner guiding shown in FIG. 3.
FIG. 5 shows a schematic detailed view of the outer guiding shown in FIG. 3.

FIG. 4 shows a detailed view of the inner guiding 17 shown in FIG. 3, comprising in the shown embodiment a guide slide support 33 which is formed as a customary TAB leading. Above the TAB leading, the roll 21 is provided which rolls along the inner side section 7 of the inner side $6_i$ of the chain link 9 and about a shaft 27.

A base 35 is provided at the upper surface of the support 11, onto which the TAB leading is positioned. The TAB leading has two ends wherein the one end interacts with a notch $28_i$ of the inner side section 7 of the chain link 9 and thus fixing the chain link 9 onto the support 11.

FIG. 5 shows a detailed view of the outer guiding 19 shown in FIG. 3. The support 11 is here also provided with a base 35 on a part of its upper surface, onto which the guide slide support 33 is arranged, wherein said guide slide support 33 is formed as a TAB leading, too. An end of the TAB leading interacts with a notch $28_e$ of the outer side $6_e$ of the chain link 9 and thus fixes the chain link 9 onto the support 11.

Figure 6:
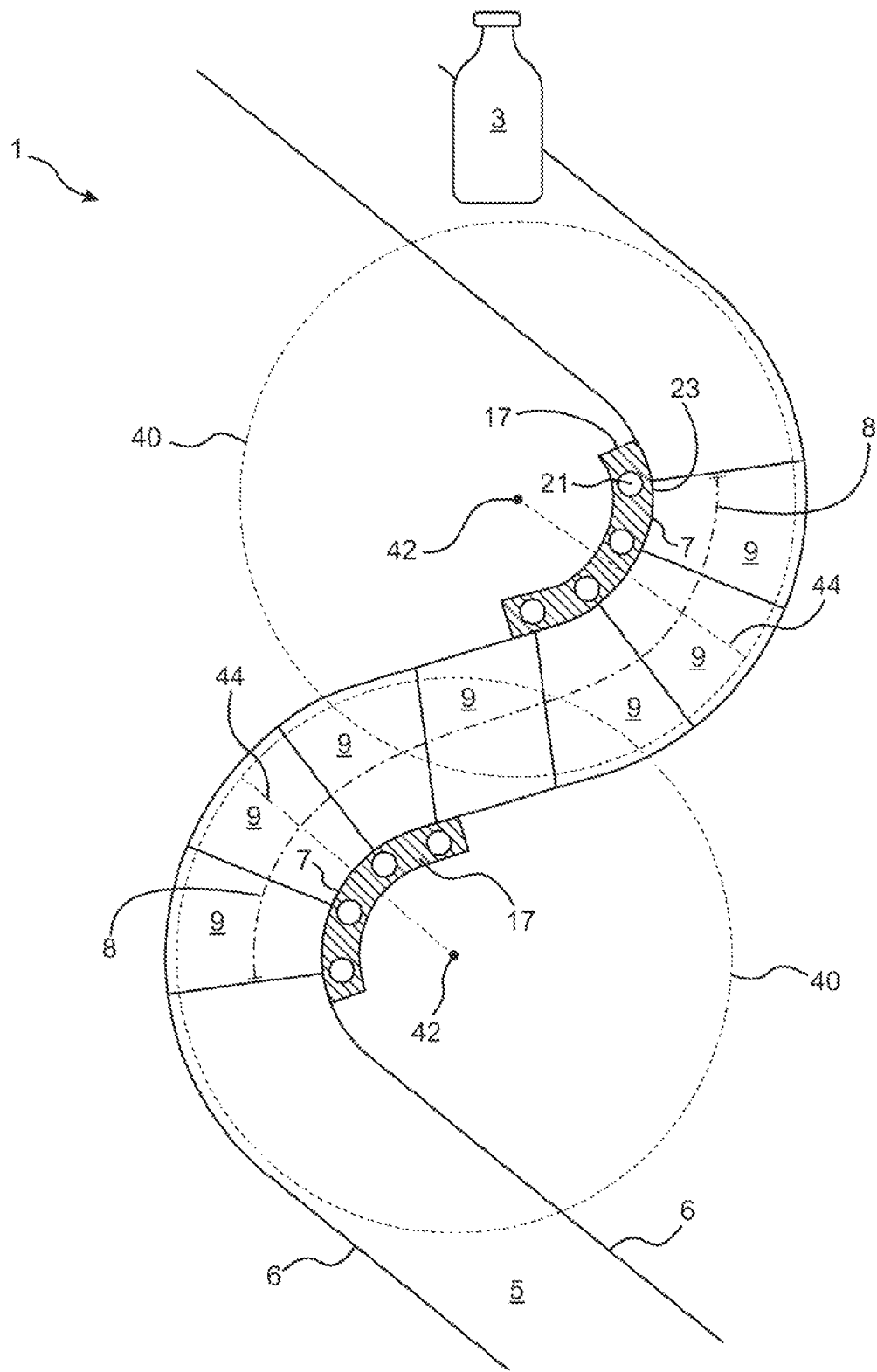
FIG. 6 shows a schematic top view of another embodiment of the conveyor means according to the invention, wherein the endless conveyor belt of the conveyor means is provided with differently positioned curvatures.

FIG. 6 shows a schematic top view of another embodiment of the conveyor means 1 according to the invention for articles 3, wherein the endless conveyor belt 5 of the conveyor means 1 is provided with different directed curvatures. Both curvatures define two curved paths 8, onto which the position of chain links is shown only very schematically. Each of both curvatures define a respective circle 40 with a radius of curvature 44 and a center point 42. Thereby, that the curvatures are directed differently, the two inner side sections 7 and the respective inner guidings 17 are positioned on opposing sides 6 of the endless conveyor belt 5.

Several rolls 21 are provided along each inner guiding 17 along the respective inner side section 7 of the endless conveyor belt 5. Each inner side section 7 runs along two chain links 9 and thus runs along two side faces 23 of these chain links 9. Each of the at least two rolls 21 interacts with each side face 23 of the chain links 9 (for this see also FIG. 2).

For the sake of clarity, only a few elements are shown in FIG. 6.

Figure 7:
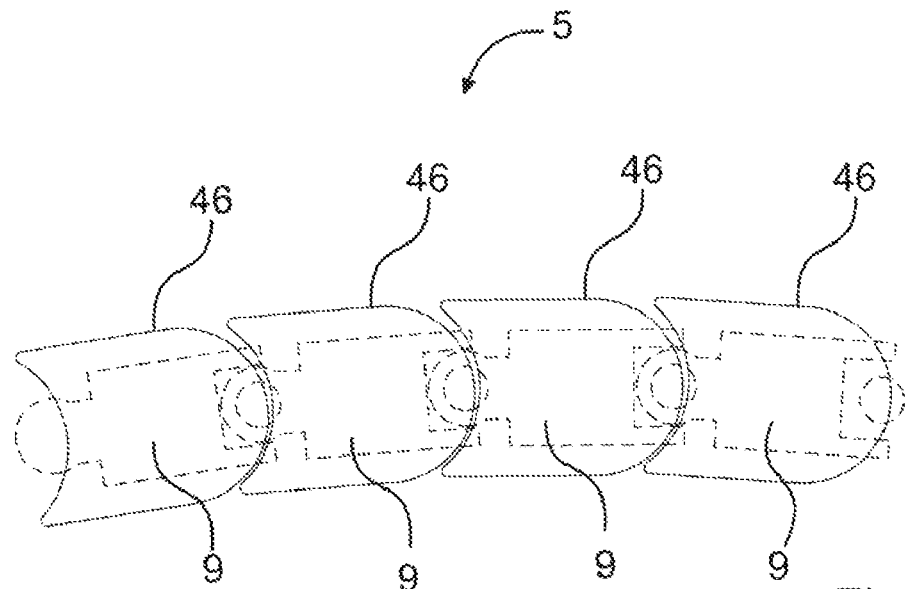
FIG. 7 shows a schematic top view of additional supports for an endless conveyor belt.
Figure 8:
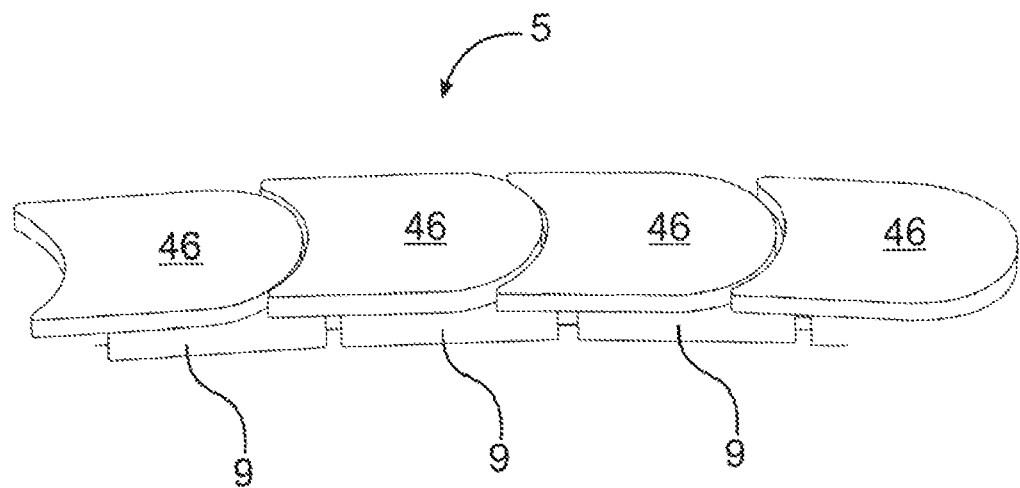
FIG. 8 shows a perspective view of the additional supports and endless conveyor belt shown in FIG. 7.

FIG. 7 shows a schematic top view of additional supports 46 for the endless conveyor belt 5 composed of chain links 9. The supports 46 are provided by bearing plates which can be optimally adjusted to the shape and size of the articles 3, such as liquid containers and bottles, to be transported. FIG. 8 shows a perspective view of the additional supports 46 of FIG. 7.

Figure 9:
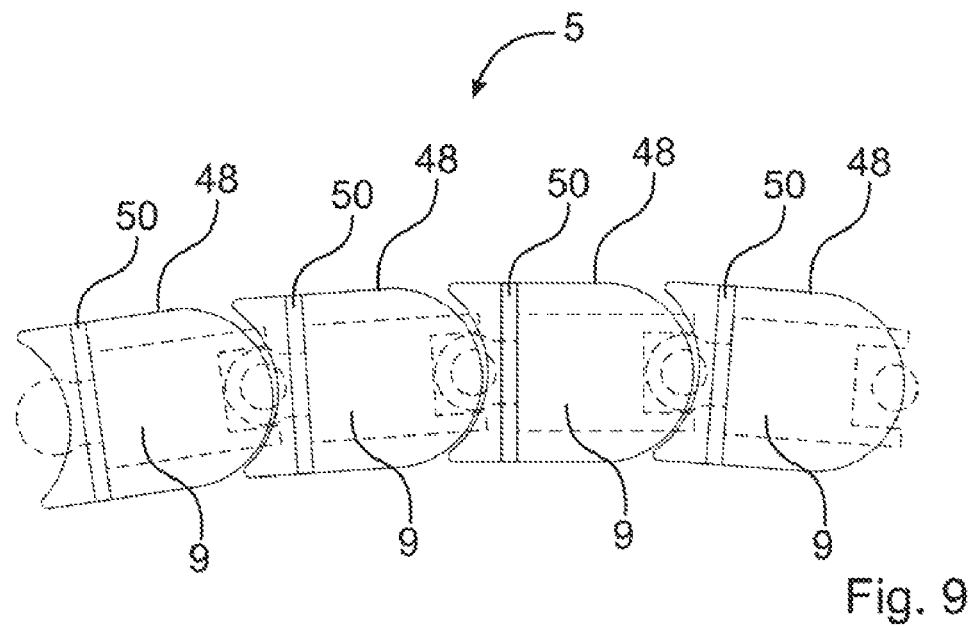
FIG. 9 shows a schematic top view of additional dogs for an endless conveyor belt; and, FIG. 10 shows a perspective view of the additional dogs and endless conveyor belt shown in FIG. 9.
Figure 10:
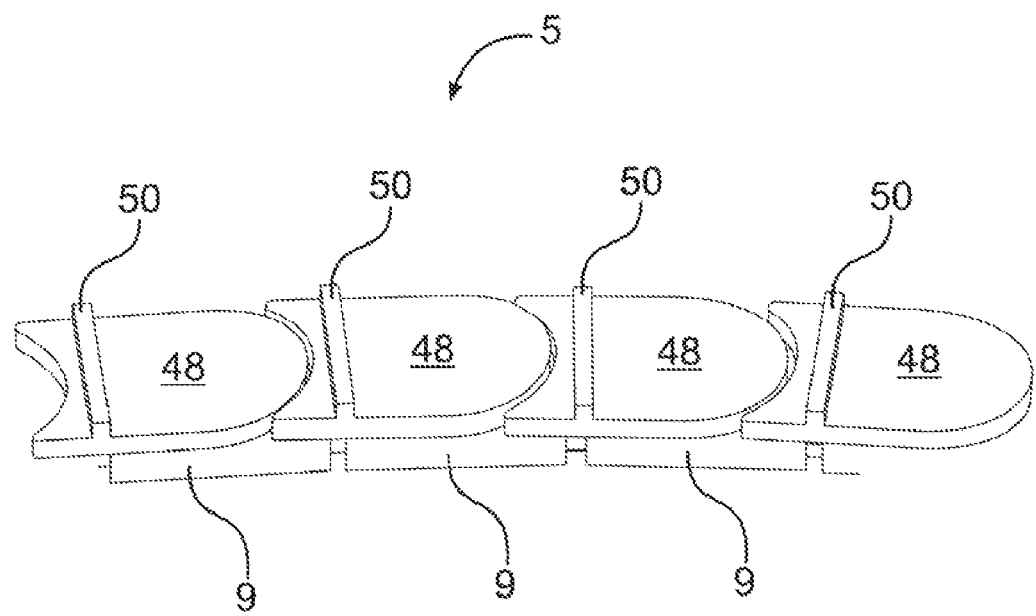

FIG. 9 shows a schematic top view of additional dogs 48 for the endless conveyor belt 5 composed of chain links 9. The dogs 48 are formed by carrier stud links 50, so that an exact adjustment to the size and the dimensions of the articles 3, such as packs or other piece good, to be transported is enabled. FIG. 10 shows a perspective view of the additional dogs 48 of FIG. 9.

Even though it is described in the figures beforehand that the articles are transported in an upright position on the endless conveyor belt, this should in no case be regarded as a limitation. Modifications are possible in which the endless conveyor belt functions as a means of transport for the articles without the necessity of transporting the articles in an upright position on the conveyor means. They may be transported glidingly in a leading, for instance, wherein dogs or the like are positioned on the endless conveyor belt which slide the articles in the leading into the conveyor means.

The invention was described with reference to a preferred embodiment. It is obvious for a skilled person, however, that modifications or changes of the invention can be carried out without departing from the scope of the following claims. In particular, other guide slide supports 33 can be used as TAB leadings, and the curved paths 8 may feature other forms than the one shown without leaving the scope of protection of the following claims.

REFERENCE NUMERALS 1 conveyor means
3 article
5 endless conveyor belt
6 side
7 inner side section
8 curved path
9 chain link
11 support
13 upper path section
14 release travel
15 inner length axis
17 inner guiding
19 outer guiding
21 roll
22 roll mounting
23 face
24 face
27 shaft
28 flute
29 frame
31 foot
33 guide slide support
35 base
40 circle
42 central point
44 radius of curvature
TR transport direction

What is claimed is:

1. A conveyor means for transporting articles comprising:
an endless conveyor belt, wherein the endless conveyor belt has lengthwise two sides;
a support that leads the endless conveyor belt and is composed of a plurality of chain links;
a curved path defined by the endless conveyor belt in at least one section, wherein the curved path having a radius of curvature with reference to a central point of a circle;
at least an inner guiding for the endless conveyor belt is provided for the support, and the inner guiding running along an inner side section of a side of the endless conveyor belt which is directly opposite of the central point at the curved path;
a plurality of rolls arranged along the inner guiding running alongside of the inner side section which interact with a face of each chain link; and,
at least one outer guiding for the endless conveyor belt is provided for the support, wherein the outer guiding runs along an outer side of the endless conveyor belt;
wherein a TAB leading is formed on the inner guiding and the outer guiding so that the TAB leading of the inner guiding interacts with a first notch of the inner side section of each chain link and the TAB leading of the outer guiding interacts with a second notch of the outer side of each chain link.

2. The conveyor means of claim 1, wherein the endless conveyor belt transcends a vertical height.

3. The conveyor means of claim 2, wherein the conveyor means is a spiral conveyor.

4. The conveyor means of claim 1, wherein the faces of the chain links have a curvature corresponding to the curvature of the inner guiding at the at least one curved path.

5. The conveyor means of claim 1, wherein during the transport each chain link is always in roll contact with at least two rolls of the inner guiding.

6. The conveyor means of claim 1, wherein a freely accessible roll mounting is provided for each of the rolls at the support.

7. The conveyor means of claim 1, wherein at least one carrying roll is provided underneath of at least several chain links and interacts with the support of the endless conveyor belt.

8. The conveyor means of claim 1, wherein the chain links of the endless conveyor belt are injection molded parts.

9. The conveyor means of claim 8, wherein the chain links are made of polymer.

10. The conveyor means of claim 1, wherein the endless conveyor belt is provided with additional supports for the articles to be transported.

11. The conveyor means of claim 1, wherein the endless conveyor belt is provided with additional dogs functioning as support and/or hub for the articles to be transported.

12. A conveyor means for transporting articles comprising:
an endless conveyor belt, wherein the endless conveyor belt is in the form of a spiral conveyor and has lengthwise two sides;
a support that leads the endless conveyor belt and is composed of a plurality of chain links;
a curved path defined by the spiral conveyor, wherein the curved path has a radius of curvature with reference to a central point of an axis of the spiral conveyor;
at least an inner guiding for the endless conveyor belt of the spiral conveyor is provided for the support, and the inner guiding running along an inner side section of a side of the endless conveyor belt which is directly opposite to the axis of the spiral conveyor;
a plurality of rolls arranged along the inner guiding running alongside of the inner side section which interact with a face of each chain link and the faces of the chain links have a curvature corresponding to the curvature of the inner guiding of the spiral conveyor; and,
at least one outer guiding for the endless conveyor belt is provided for the support, wherein the outer guiding runs along an outer side of the endless conveyor belt;
wherein a TAB leading is formed on the inner guiding and the outer guiding so that the TAB leading of the inner guiding interacts with a first notch of the inner side section of each chain link and the TAB leading of the outer guiding interacts with a second notch of the outer side of each chain link.

13. A conveyor means for transporting articles comprising:
an endless conveyor belt, wherein the endless conveyor belt is in the form of a spiral conveyor and has lengthwise two sides;
a support that leads the endless conveyor belt and is composed of a plurality of chain links;

a curved path defined by the spiral conveyor, wherein the curved path has a radius of curvature with reference to a central point of an axis of the spiral conveyor;

at least an inner guiding for the endless conveyor belt of the spiral conveyor is provided for the support, and the inner guiding running along an inner side section of a side of the endless conveyor belt which is directly opposite to the axis of the spiral conveyor;

a plurality of rolls arranged along the inner guiding running alongside of the inner side section which interact with a face of each chain link and the faces of the chain links have a curvature corresponding to the curvature of the inner guiding of the spiral conveyor;

at least one outer guiding for the endless conveyor belt is provided for the support, wherein the outer guiding runs along an outer side of the endless conveyor belt;

wherein a TAB leading is formed on the inner guiding and the outer guiding so that the TAB leading of the inner guiding interacts with a first notch of the inner side section of each chain link and the TAB leading of the outer guiding interacts with a second notch of the outer side of each chain link; and, dogs and/or hubs for the articles to be transported are provided on the endless conveyor belt.

* * * * *